(12) United States Patent
Sieck (10) Patent No.: US 12,185,697 B2
(45) Date of Patent: Jan. 7, 2025

(54) MOBILE APPLICATION FOR LIVESTOCK HEAT MONITORING

(71) Applicant: Sieck Ranch, Inc., Martell, NE (US)

(72) Inventor: Brent Allen Sieck, Martell, NE (US)

(73) Assignee: Sieck Ranch, Inc., Martell, NE (US)

( * ) Notice: Subject to any disclaimer, the term of this patent is extended or adjusted under 35 U.S.C. 154(b) by 0 days.

(21) Appl. No.: 18/200,880

(22) Filed: May 23, 2023

(65) Prior Publication Data

US 2023/0292715 A1 Sep. 21, 2023

Related U.S. Application Data (63) Continuation of application No. 17/103,411, filed on Nov. 24, 2020, now Pat. No. 11,696,570.

(51) Int. Cl.
*G08B 21/00* (2006.01)
*A01K 29/00* (2006.01)
*G06F 3/0482* (2013.01)
*H04M 1/72451* (2021.01)

(52) U.S. Cl.
CPC .......... *A01K 29/005* (2013.01); *G06F 3/0482* (2013.01); *H04M 1/72451* (2021.01)

(58) Field of Classification Search
CPC ............... A01K 29/005; G06F 3/0482; H04M 1/72451; H04M 1/72403
USPC ......................................................... 340/573.3
See application file for complete search history.

(56) References Cited

U.S. PATENT DOCUMENTS

| | | | | |
|---|---|---|---|---|
| 4,895,165 | A * | 1/1990 | Blair | A61D 17/002 600/587 |
| 7,083,575 | B1 | 8/2006 | Claycomb et al. | |
| 7,927,287 | B2 * | 4/2011 | Anderson | A01K 11/00 600/595 |
| 2008/0128486 | A1 | 6/2008 | Lowe | |
| 2011/0218391 | A1 | 9/2011 | Signorini et al. | |
| 2013/0340305 | A1 | 12/2013 | Mobley | |
| 2019/0183436 | A1 | 6/2019 | Yajima et al. | |

* cited by examiner

*Primary Examiner* — Mark S Rushing
(74) *Attorney, Agent, or Firm* — Barnes & Thornburg, LLP; Steven D. Shipe (57) ABSTRACT

Devices, systems, and methods for monitoring livestock can include a mobile platform arranged to present the user with an optimal breeding period based on mount activity of the livestock assets. Monitoring optimal breeding periods can increase likelihood of healthy breeding, including through real-time information.

20 Claims, 7 Drawing Sheets

FIG. 14

MOBILE APPLICATION FOR LIVESTOCK HEAT MONITORING

CROSS-REFERENCE TO RELATED APPLICATIONS

This utility application is a continuation application of, and claims the benefit of priority to, U.S. application Ser. No. 17/103,411, filed Nov. 24, 2020, which is incorporated by reference herein in its entirety.

FIELD

The present disclosure relates generally to devices, systems, and methods for managing livestock, and more specifically to devices, systems, and methods for livestock monitoring.

BACKGROUND

Monitoring livestock can provide valuable information regarding various livestock assets. Livestock information can be applied to benefit the health and well-being of the assets, and/or improve efficiency of livestock activities.

For example, monitoring livestock for breeding-related information can provide improved likelihood of healthy breeding. However, accurately monitoring livestock assets can present challenges in obtaining cost-effective, accurate information.

SUMMARY

The present disclosure may comprise one or more of the following features and combinations thereof.

According to an aspect of the present disclosure, a method of operating a mobile platform for monitoring breeding periods of livestock including receiving indication of mount activity of an individual asset of livestock, determining an optimal breeding time of the individual asset of livestock based on the received indication of mount activity, and presenting, on a display screen, the optimal breeding time of the individual asset of livestock to a user.

In some embodiments, receiving indication of mount activity of an individual asset of livestock may include receiving indication of time of mounting activity of the individual asset of livestock. Determining an optimal breeding time of the individual asset of livestock may include determining a time in the future based on the time of mount activity as the optimal breeding time for the individual asset of livestock. Determining the time in the future based on the time of mount activity may include forecasting the time in the future as the optimal breeding time. Determining the time in the future based on the time of mounting activity as the optimal breeding time for the individual asset of livestock may include determining a window of time as the optimal breeding time for the individual asset of livestock. Determining the time in the future based on the time of mounting activity as the optimal breeding time for the individual asset of livestock may include defining a beginning of the optimal breeding time by a predetermined period after the time of mounting activity of the individual asset of livestock.

In some embodiments, receiving indication of mount activity may include receiving indication of one or more mount incidents of the individual asset of livestock. Each indication of one or more mount incidents of the individual asset of livestock may include indication of time of the respective mount incident. Presenting may include presenting an indication of each mount incident to the user. Presenting may include indicating to the user one or more of the mount incidents as being presently selected for consideration in determining the optimal breeding time. In some embodiments, the method may further include enabling user input selection of one or more of the presented indications of the mount incidents for consideration in determining the optimal breeding time.

According to another aspect of the present disclosure, a mobile platform for monitoring breeding periods of livestock may include a display, and a communication system including a processor configured for executing instructions stored on the memory. The communication system may be configured to receive indication of mount activity of an individual asset of livestock, determine an optimal breeding time of the individual asset of livestock based on the received indication of mount activity, and/or to communicate with the display to present the optimal breeding time of the individual asset of livestock to a user.

In some embodiments, the communication system may be configured for receiving indication of mount activity of an individual asset of livestock by receiving indication of time of mounting activity of the individual asset of livestock. The communication system may be configured for determining an optimal breeding time of the individual asset of livestock by determining a time in the future based on the time of mount activity as the optimal breeding time for the individual asset of livestock. The communication system may be configured for determining the time in the future based on the time of mounting activity as the optimal breeding time for the individual asset of livestock by determining a window of time as the optimal breeding time for the individual asset of livestock. In some embodiments, the communication system may be configured for determining the time in the future based on the time of mounting activity as the optimal breeding time for the individual asset of livestock by defining a beginning of the optimal breeding time by a predetermined period after the time of mounting activity of the individual asset of livestock.

In some embodiments, the communication system may be configured for receiving indication of mount activity as one or more mount incidents of the individual asset of livestock. Each indication of one or more mount incidents of the individual asset of livestock may include indication of time of the respective mount incident. The communication system may be configured for communicating with the display to present an indication of each mount incident to the user.

In some embodiments, the communication system may be configured for communicating with the display to indicate to the user one or more of the mount incidents as being presently selected for consideration by the communication system for determining the optimal breeding time. The communication system may be configured for enabling user input selection of one or more of the presented indications of the mount incidents for consideration in determining the optimal breeding time. In some embodiments, the mobile platform may include a personal mobile device.

In some embodiments, the communication system may be configured to communicate a breeding instruction to conduct breeding based on user input. The communication may be configured to present with the display a breed button for user selection to indicate breed instruction. The communication may be configured to present with the display at least one of an artificial insemination button for user selection to indicate artificial instruction and/or an embryo transplant button for user selection to indicate embryo transplant, responsive to user selection of the breed button. Responsive to user selection of one the at least one of an artificial insemination button and/or the embryo transplant button, the communication system may be configured to communicate the breed instruction indicating the corresponding artificial insemination or embryo transplant instruction according to user selection.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Monitoring livestock, such as cattle, can be challenging. The number of livestock of typical commercial livestock operations, together with the amount of land area that livestock may require can present challenges in communication of monitoring information. Among other parameters of interest for monitoring in livestock, monitoring livestock for preferred breeding periods can assist in determining and/or selecting opportune breeding conditions. For example, monitoring estrus cycles for cows/heifers (cattle) can indicate a desirable time period for insemination, increasing the likelihood of healthy breeding. Systems, devices, and methods for overcoming the challenges of livestock monitoring are discussed herein.

Figure 1:
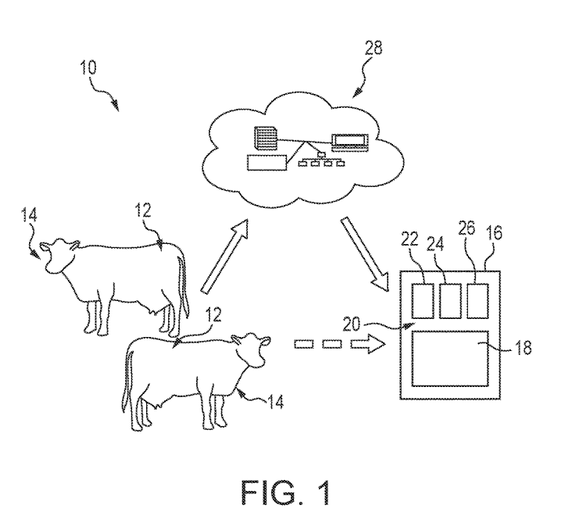
FIG. 1 is diagrammatic view of a monitoring system for livestock showing that the system includes a mobile platform for presenting a user with optional breeding time for livestock animal assets, real-time.

Referring to FIG. 1, a livestock monitoring system 10 is shown allowing monitoring of breeding periods of livestock assets. The monitoring system 10 includes a monitoring device 12, embodied as a patch secured with an animal asset 14. The patch 12 is adapted to sense that the asset is being mounted for breeding (intercourse), by other livestock, for example, mounting of a heifer or cow asset 14 (to which the patch 12 is secured) by a bull or another cow. Upon sensing of mounting, the patch 12 communicates an indication of mounting incident. Examples of suitable monitoring devices can include those disclosed within U.S. Patent Application Publication No. 2020/0146263, the contents of which are hereby incorporated by reference, in their entirety, including at least those portions concerning livestock monitoring.

The patch 12 illustratively communicates indication of mount activity to a mounting platform 16. The mounting platform 16 is illustratively embodied as a mobile device including a display 18 and control system 20 comprising processor 22, memory 24, and communication circuitry 26. The processor 22 executes instructions stored on memory 24, and sends/receives communications signals via the communication circuitry 26. Examples of suitable mobile devices may include smartphones, tablets, portable computers, and/or wearable computing devices.

The patch 12 may communicate indication of mount activity to the mount platform 16 directly and/or indirectly. For example, the patch 12 may communicate with the mount platform 16 a network 28, such as a mobile network, or other intermediary, and/or by direct transmission to the mount platform 16. Examples of mobile networks may include 3G/4G/5G wireless networks, and/or any other suitable communications architecture or network.

Figure 2:
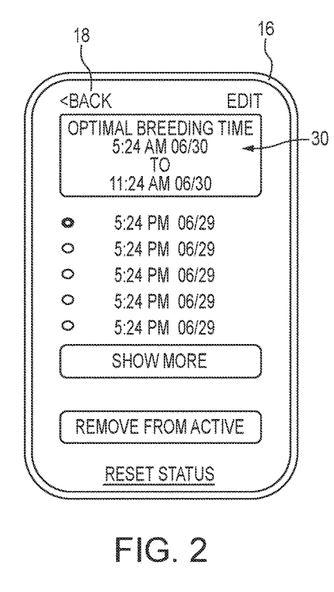
FIG. 2 a plan view of the mobile platform showing presentation of optimal breeding time on a display.

Referring to FIG. 2, the mount platform 16 as a mobile device is shown in additional detail. The display 18 is illustratively embodied as a touch screen display allowing user input by touch activation and/or by stylus. In FIG. 2, the display 18 is presently displaying an indication of an optimal breeding time 30 determined in accordance with disclosed embodiments. The optimal breeding time 30 is illustratively embodied as a time window of preferred breeding determined by the control system 20 based on mount activity and presented for the user.

Figure 3:
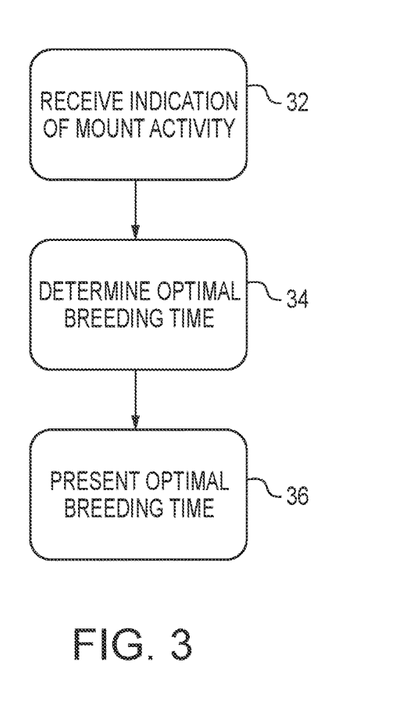
FIG. 3 is flow diagram of operations indicating reception of mount activity of an animal asset, determination of optimal breeding time, and presentation of the determined optimal breeding time.

Referring now to FIG. 3, operation of the mobile device 16 for monitoring breeding periods is shown. In box 32, the mobile device 16 receives indication of mount activity. In some embodiments, box 32 may include sending indication of mount activity, for example, from a patch 12 secured to an animal asset. In box 34, the mobile device 34 determines the optimal breeding time 30. Box 34 may include receiving user input as discussed herein. The mobile device 16 illustratively determines the optimal breeding time 30 for an individual animal asset based on the indication of mount activity received.

In box 36, the mobile device 16 presents the optimal breeding time to the user. In the illustrative embodiment, the mobile device 16 presents the optimal breeding time to the user by presentation on the display 18. In some embodiments, any suitable presentation to the user may be included, for example but without limitation, projecting and/or transmitting an image and/or audio indicating the optimal breeding time 30, for example, by a remote display.

Figure 4:
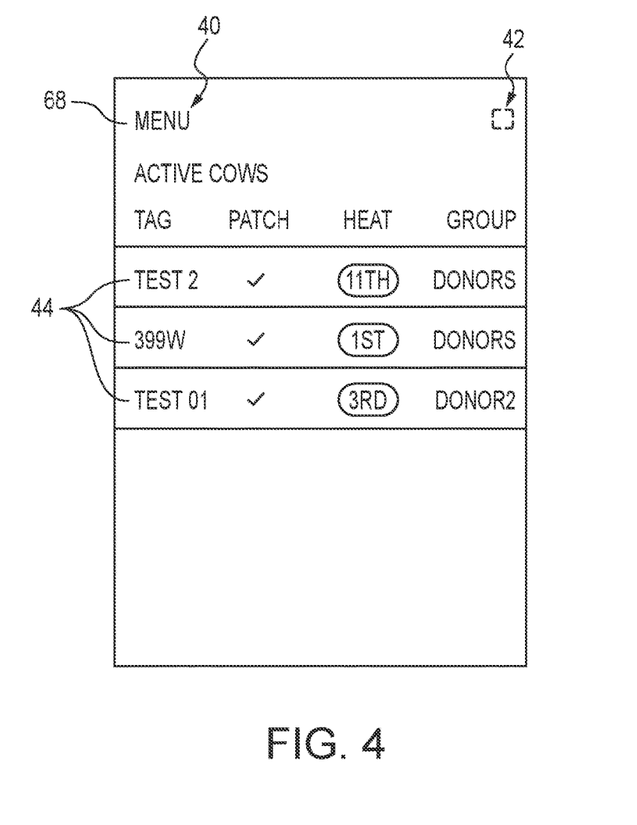
FIG. 4 is a screen of the display of the mobile platform indicating an initial page.

Referring to FIG. 4, an initial page for presentation on the display 18 of the device is shown indicating active cows. In the illustrative embodiment, three cows are presently being monitored as indicated by three different active patches 12 each indicated by their tag name "test 2," "399 W," and "test 01." Each active patch 12 is indicated as currently active by a check mark in the Patch column which indicates recent communication with the patch 12. Each active patch 12 indicates current heat rating including the number of heat cycles as shown in the Heat column. Each active patch 12 is indicated as being assigned to a pre-determined group as indicated under the Group column. In the illustrative embodiment, the patches 12 "test 2," "399 W," are assigned to the group "donor" and the patch 12 "test 01" is assigned to the group "Donor2". Assigning patches to groups can assist in organizing the information received and/or in organizing asset management activities for user presentation.

The initial page includes a menu button 40 for user selection to present menu options as discussed in additional detail herein. The initial pages includes a scanner button 42 for user selection to allow scanning of patch information to register patches 12 with the mobile device 16 as active patches 12. Selection of the scanner button 42 illustratively activates (with user authorization) a camera of the mobile device 16 to permit visual scanning of associated information of the patch 12 to be registered, such as by 1 or 2-dimensional barcode having identifying information of the associated patch 12. Upon scanning the information of the patch 12, the mobile device 16 can activate registration of the associated patch 12, with pre-populated information, within the base application and/or through designated registration device, such as a website.

Figure 5:
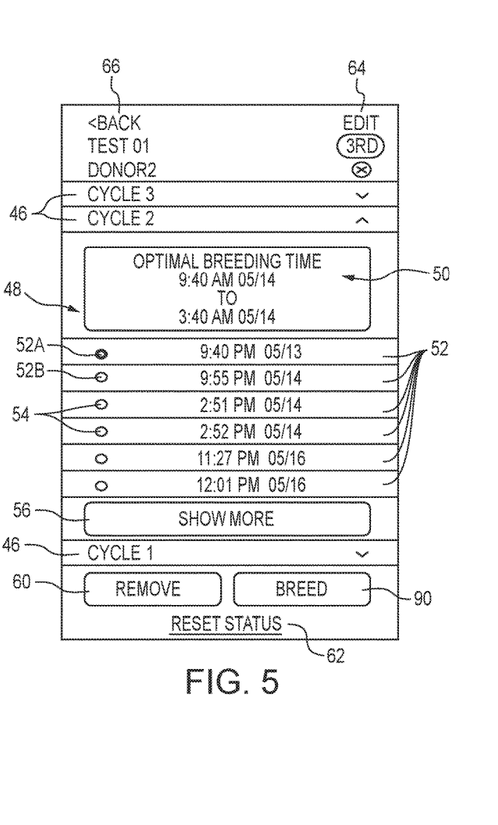
FIG. 5 is a screen of the display of the mobile platform indicating an information page.

In FIG. 4, the individual active patches 12 are available for user selection by user selection of the corresponding line item 44. Referring now to FIG. 5, a user has selected the "test 01" line item 44 which causes a transition to the information page for the test 01 patch 12. The information page indicates that the mobile device 16 has determined that three different cycles have occurred for the cow associated with the test 01 patch 12, including "Cycle 1," "Cycle 2," and "Cycle 3." Each of the cycles 1-3 are designated by line item 46 and are available for user selection to expand the corresponding information section 48.

In the present status as shown in FIG. 5, the user has selected the line item 46 for the Cycle 2 as indicated by the up "A" symbol on the right hand side. User selection of the line item 46 expands the corresponding information section 48 on the display 18. The information section for each of the Cycle 1 and Cycle 3 line items 46 remains collapsed but available for user selection.

In the information section 48 for the Cycle 2 line item, an optimal breeding time 50 is presented. The optimal breeding time is presently indicated as a time window from 9:40 AM on May 14 to 3:40 PM on May 14. The information section 48 indicates mount activities line items 52. Each of the mount activities line items 52 indicates a time of mount activity, for example, a first mount activity 52A at 9:40 PM on May 13, and second mount activity 52B at 9:55 AM on May 14. The indicated time of mount activity for each line item 52 is associated with an indication of mount activity provided by the associated patch 12, here the patch 12 corresponding with test 01. Within the information section 48, a show more button 56 is presented for user selection to display additional mount activity, such as less recently mount activity of the Cycle 2.

Each line item 52 includes an activation indicator 54 indicating whether the line item 52 is presently selected. For example, in FIG. 5, the line item 52 corresponding to mount activity at 9:40 PM May 13 is indicated as presently selected (as indicated by darkening) while the other line items 52 are indicated as deselected (as indicating by lightening). In the illustrative embodiment, present selection of the particular line item 52 indicates that the mount activity line item 52 is deemed a primary mount activity, used by the mobile device 16 to determine the optimal breeding time.

The mobile device 16 determines the optimal breeding time based on the presently selected primary mount activity. In the illustrative embodiment, the mobile device determines the optimal breeding time as a window of time in the future after the time indicated by the primary mount activity. In the example as depicted in FIG. 5, the presently selected primary mount activity occurred at 9:40 PM May 13, and the mobile device 16 has determined that the optimal breeding time is between 9:40 AM on May 14 to 3:40 PM on May 14, representing a 6-hour window of time beginning 12 hours after the time of the primary mount activity and ending 18 hours after the primary mount activity.

In the illustrative embodiment, the mobile device 16 determines the optimal breeding time as predetermined period of time relative to the selected primary mount activity. In some embodiments, the mobile device 16 may determine the optimal breeding time based on any suitable manner in consideration of the mount activity indication, for example, by weighed analysis considering the frequency of mount activity indications within a pre-determined time period. For example, the mobile device 16 may determine that greater frequency of mount activity within a rolling 4-hour time period indicates greater likelihood that the corresponding cow is in heat, and therefore may apply a greater weighting value to mount activity indications within the rolling 4-hour window in determining the optimal breeding time.

In some embodiments, the user may select and/or adjust the predetermined period of time relative to the primary mount activity for the optimal breeding time, for example, the user may adjust the pre-determined 6-hour window to be a 4-hour window or a 6-hour window, and/or may adjust the beginning of the window of time, for example, to begin 8 hours or 13 hours after the time of the primary mount activity, and/or may adjust the ending of the window of time, for example, to begin 16 hours or 20 hours after the time of the primary mount activity. In some embodiments, the user may be permitted to select more than one line item 54 as a primary mount activity and the mobile device 16 may determine the optimal breeding time based on each primary mount activity for the corresponding patch 12, for example, by average of the times, and/or by weighting of the times of the primary mount activities.

The information page includes a remove button 60 for user selection to remove a presently selected device from activity. The information page includes a reset button 62 for user selection to reset the mount activity line items 52. The information page includes an edit button 64 for user selection to allow the user to edit the tag name and/or the assigned group of the presently selected patch 12. The information page includes a cancel button 73 for closing the top level menu 70. The information page includes a back button 66 for user selection to return to the initial page.

Figure 6:
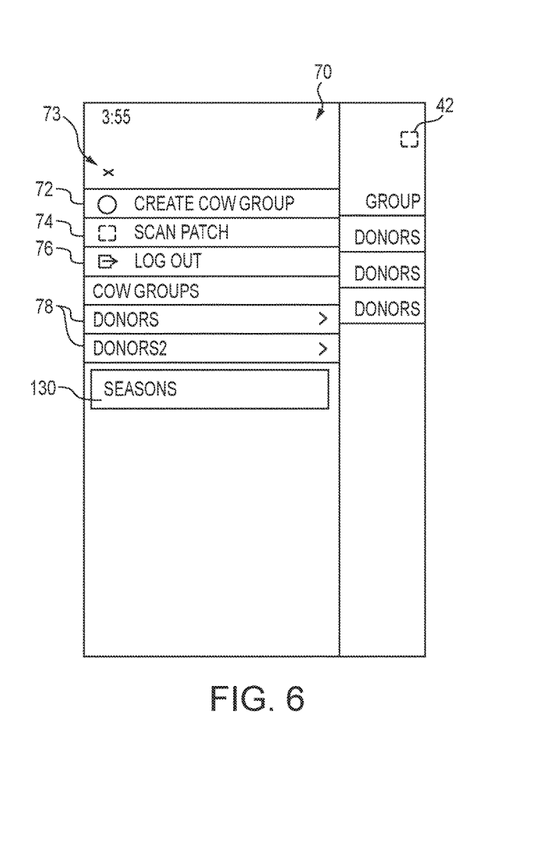
FIG. 6 is a screen of the display of the mobile platform indicating a top level menu.

Returning briefly to FIG. 4, the initial page includes a menu button 68 for user selection to call up a top level menu 70 as suggested in FIG. 6. The top level menu 70 is embodied as a menu panned in from the left side of the display 18. The top level menu 70 includes a create cow group button 72 for user selection to create a new group for patches 12, a scan button 74 for user selection to scan a code from a patch 12 as mentioned above, a log out button for user selection to log out of a present account, and a list of available cow groups having line items 76 for each group for user selection to access the corresponding information page.

Figure 7:
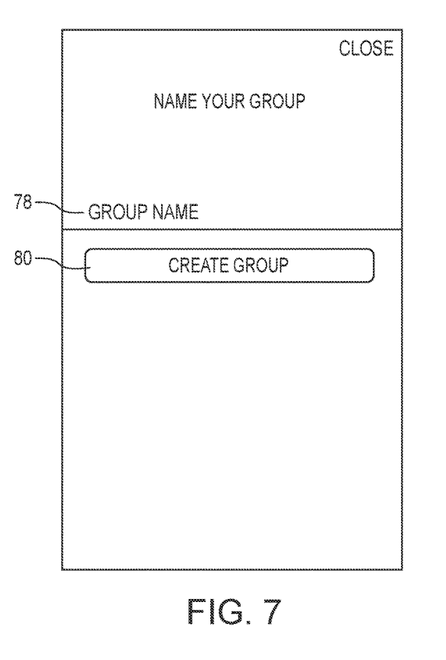
FIG. 7 is a screen of the display of the mobile platform indicating a create group page.

User selection of the create cow group button 72 causes presentation of the create group page as suggested in FIG. 7. The create group page includes a text entry field 78 for user selection to enter text for the group name. Entry of text into the text entry field 78 cause responsive activation of the create group activation button 80. Activation of the create group activation button 80 creates the new group for assignment of patches 12 and returns to the initial page.

Figure 8:
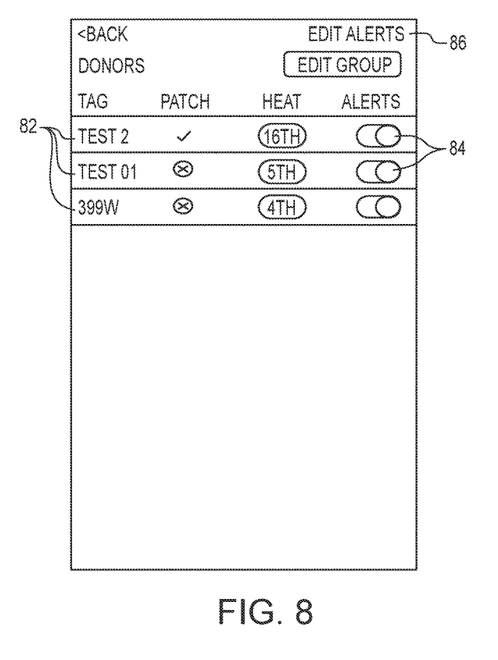
FIG. 8 is a screen of the display of the mobile platform indicating a group page.

Returning briefly to FIG. 6, user selection of one of the cow group line items 78 causes presentation of the group page as suggest in FIG. 8. The group page include a list of patch line items 82 indicating each patch 12 assigned to the presently selected group. Each line item 82 includes a patch status as being either currently active as indicated by a check mark or inactive as indicated by an x mark, in the Patch column. Each line item 82 indicates current heat rating for the corresponding patch 12 including the number of heat cycles as shown in the Heat column.

Each line item 82 includes an alert button 84 indicating a present state of alerts. In the present example depicted in FIG. 8, the alert button 84 of each line item 82 is presently set to active as indicating by the alert buttons 84 being shifted to the right. When alerts are set to active for a given patch line item 82, upon receiving mount activity indication from the corresponding patch 12, the mobile device 16 delivers a notification, such as a tone, vibration, and/or message on display 18 according to the settings of the mobile device 16. The group page includes an edit alerts button 86 for user section to activate toggling of the alert buttons 84 for user selection to toggle each alert button 86 between the active and inactive positions, activating and inactivating alerts for each line item 82, respectively.

The group page includes an edit group button 88 for user selection to edit the presently selected group. User selection of the edit group button 88 presents a text entry box with the group name for user selection for editing, and confirmation button for user selection to confirm changes to the presently selected group name.

Returning briefly to FIG. 5, the information page includes a breed button 90 for user selection to consider breed options for the presently selected livestock asset for communicating breeding instruction to conduct breeding for that asset. Responsive to user selection of the breed button 90, a breed window 92 is presented as suggested in FIG. 9. The breed window 92 presents an artificial insemination (AI) button 94 for user selection to provide instruction for artificial insemination for the asset and an embryo transplant (ET) button 96 for user selection to provide instruction for embryo transplant for the asset.

Figure 10:
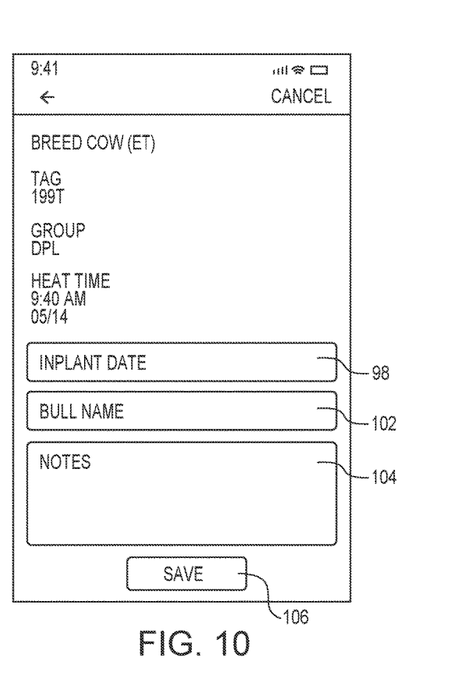
FIG. 10 is a screen of the display of the mobile platform indicating an embryo transplant.

Responsive to user selection of the embryo transplant button 96, the display 18 presents an ET page as suggested in FIG. 10. The ET page includes indication that the ET option has been selected by parenthetical "(ET)". The ET page can indicate the presently selected tag number, group (if assigned), and/or indication of the starting time of the optimal breeding time. The ET page includes an implant date field 98 for user entry of the date of implant desired, a bull name field 102 for user entry of a desired bull sire name, and a notes field 104 for user entry of additional notations. User entry into fields 98, 102, 104 illustratively as alpha-numeric fields includes user selection of the corresponding entry field which prompts display of a corresponding alpha-numeric keyboard for user entry of information. The ET page includes a save button 106 for user selection to save entries to the ET fields 98, 102, 104.

Figure 9:
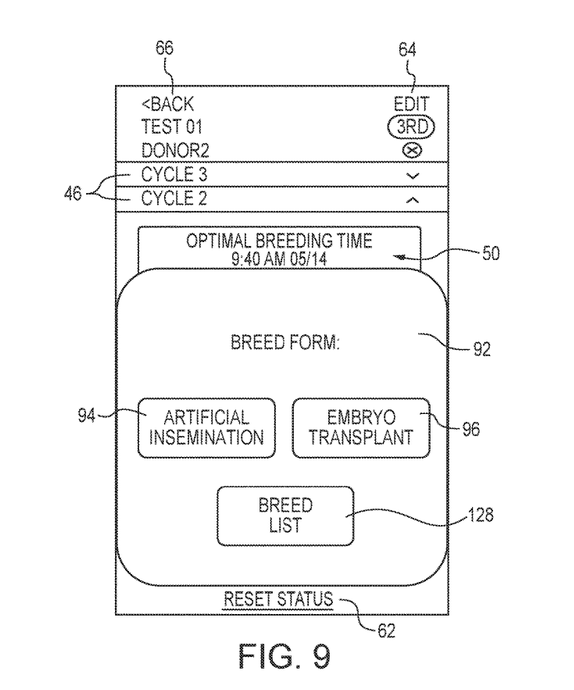
FIG. 9 is a screen of the display of the mobile platform indicating a breed option for user selection.
Figure 11:
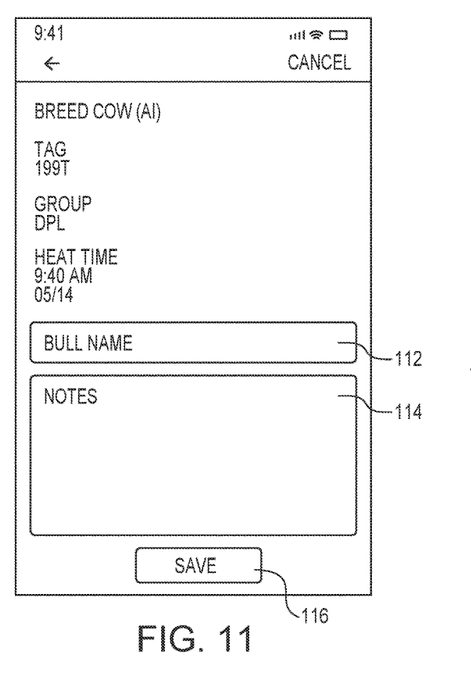
FIG. 11 is a screen of the display of the mobile platform indicating an artificial insemination.

From the breed option window 92 as shown in FIG. 9, responsive to user selection of the AI button 94, the display 18 presents an AI page as suggested in FIG. 11. The AI page includes indication that the AI option has been selected by parenthetical "(AI)". The AI page can indicate the presently selected tag number, group (if assigned), and/or indication of the starting time of the optimal breeding time. The AI page includes a bull name field 112 for user entry of a desired bull sire name, and a notes field 114 for user entry of additional notations. User entry into fields 112, 114 illustratively as alpha-numeric fields includes user selection of the corresponding entry field which prompts display of a corresponding alpha-numeric keyboard for user entry of information. The ET page includes a save button 116 for user selection to save entries to the AI fields 112, 114.

Responsive to user selection of the save button 106, 116 for either of the AI or ET pages, the communication system 26 communicates a breeding instruction signal indicating either the AI or ET selection according to the user's input. The breeding instruction is embodied as a communication signal indicating either the ET or AI selection, identifying information (e.g., tag number, group (if assigned), heat time), and/or the information entered into the respective fields 96, 102, 104, 112, 114. The breeding instruction is illustratively communicated to remote systems, such as a cloud-based computer system, via network 28, but in some embodiments may be communicated with any suitable remote device, including but not limited to a centralized computer and/or personal mobile devices. The breeding instruction can be communicated to others, for example, by viewing via a display, and/or implemented as wholly or partly automated, for example, by configuring access of the asset to relevant farm areas (e.g., allowing electronic gate access to confined spaces or certain fields) as a command for breeding of the particular asset.

Figure 12:
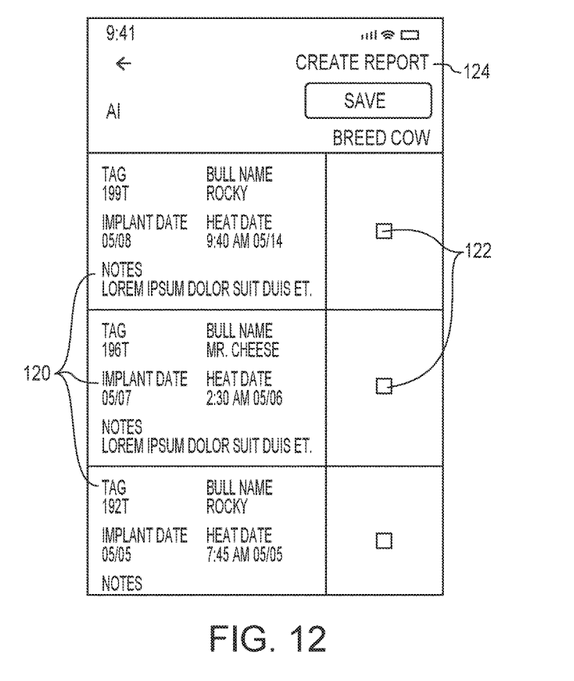
FIG. 12 is a screen of the display of the mobile platform indicating an list of breedings.

Responsive to successful saving of a new breeding instruction (and/or responsive to selection of the breeding list button 128 on FIG. 9), the display 18 presents a breeding list as suggested in FIG. 12. The breeding list illustratively includes breed command entries 120. Each breed command entry 120 can include the corresponding tag number, bull name, implant (or insemination) date, heat date, and/or notes as entered. Each breed command entry 120 includes a check box 122 for user selection. Upon user selection of one or more check boxes, a create report button 124 is activated for user selection to create a printable output of the selected breed command entries 120.

Figure 13:
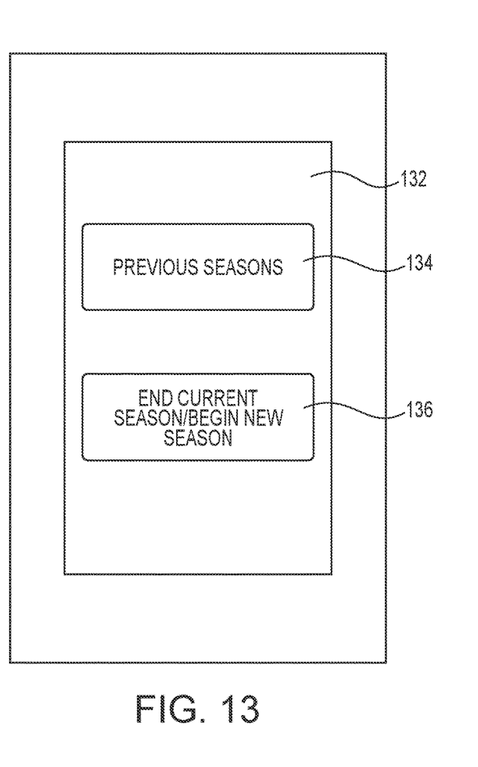
FIG. 13 is a screen of the display of the mobile platform indicating a seasons option for user selection.
Figure 14:
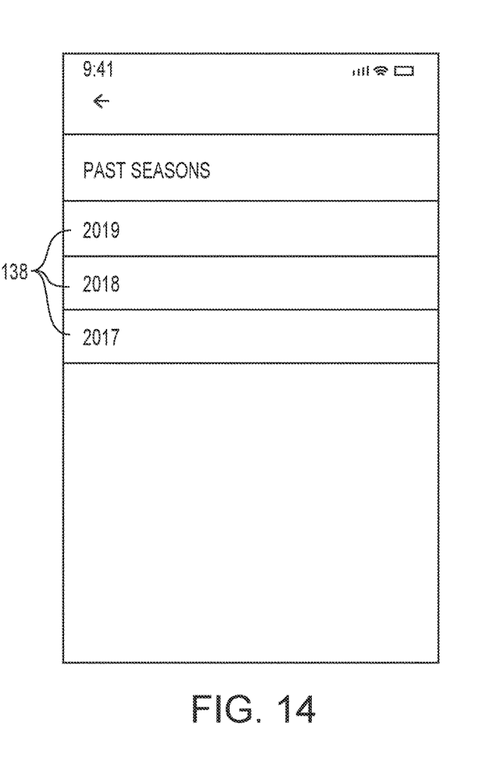
FIG. 14 is a screen of the display of the mobile platform indicating a past seasons list.

Returning briefly to FIG. 6, responsive to user selection of a seasons button 130 the display 18 presents a seasons window 132. The seasons window 132 presents a previous seasons button 134 for user selection to present information regarding previous seasons and an end current season/begin new season button 136 for user selection to complete the existing season and begin a new season. Responsive to user selection of the previous seasons button 134, the display 18 presents a past seasons list as suggested in FIG. 14. The past seasons list includes past season entries 138 indicating the corresponding season year, each of which is available for user selection to access the information for mount activity, breeding, and related information for previously saved season years. In the illustrative embodiment, selecting a previous season entry 138 allows user access to the information of the corresponding year in similar manner as described for current season information.

Accordingly, within the present disclosure monitoring of livestock can be achieved including determining and/or presentation of optimal breeding times to a user. In some embodiments, determination of optimal breeding time may be conducted remotely and communicated to the mobile device for presentation to the user. In such embodiments, mount activity may be presented to the user for user selection of primary mount activity and communicated remotely for determination of optimal breeding time. Within the present disclosure, examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry 58 includes components for facilitating processor operations, for example, suitable components may include transmitters, receivers, modulators, demodulator, filters, modems, analog to digital converters, operational amplifiers, and/or integrated circuits.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of operating a mobile platform for monitoring breeding periods of livestock, comprising:
    receiving indication of mount activity of an individual asset of livestock, including receiving indication of time of mounting activity of the individual asset of livestock,
    determining, via a processor, an optimal breeding time of the individual asset of livestock based on the received indication of mount activity, including determining a time in the future based on the time of mount activity as the optimal breeding time for the individual asset of livestock including defining a beginning of the optimal breeding time by a predetermined period of time after the time of mounting activity of the individual asset of livestock, and
    presenting to a user, on a display screen, the optimal breeding time of the individual asset of livestock and an option to adjust the predetermined period of time.

2. The method of claim 1, wherein determining the time in the future based on the time of mounting activity as the optimal breeding time for the individual asset of livestock includes determining a window of time as the optimal breeding time for the individual asset of livestock.

3. The method claim 1, wherein receiving indication of mount activity includes receiving indication of one or more mount incidents of the individual asset of livestock.

4. The method claim 3, wherein each indication of one or more mount incidents of the individual asset of livestock includes indication of time of the respective mount incident.

5. The method claim 4, wherein presenting to a user includes presenting an indication of each mount incident.

6. The method claim 4, wherein presenting to a user includes indicating one or more of the mount incidents as being presently selected for consideration in determining the optimal breeding time.

7. The method claim 4, further comprising, enabling user input selection of one or more of the presented indications of the mount incidents for consideration in determining the optimal breeding time.

8. A mobile platform for monitoring breeding periods of livestock comprising:
    a display screen, and
    a communication system including a processor configured for executing instructions stored on memory, the communication system configured to receive indication of mount activity of an individual asset of livestock by receiving indication of time of mounting activity of the individual asset of livestock, to determine an optimal breeding time of the individual asset of livestock based on the received indication of mount activity by determining a time in the future based on the time of mount activity as the optimal breeding time for the individual asset of livestock by defining a beginning of the optimal breeding time by a predetermined period after the time of mounting activity of the individual asset of livestock, and to communicate with the display screen to present to a user the optimal breeding time of the individual asset of livestock and an option to adjust the predetermined period of time.

9. The mobile platform of claim 8, wherein the communication system is configured for determining the time in the future based on the time of mounting activity as the optimal breeding time for the individual asset of livestock by determining a window of time as the optimal breeding time for the individual asset of livestock.

10. The mobile platform claim 8, wherein the communication system is configured for receiving indication of mount activity as one or more mount incidents of the individual asset of livestock.

11. The mobile platform claim 10, wherein each indication of one or more mount incidents of the individual asset of livestock includes indication of time of the respective mount incident.

12. The mobile platform claim 11, wherein the communication system is configured for communicating with the display to present to a user an indication of each mount incident.

13. The mobile platform of claim 11, wherein the communication system is configured for enabling user input selection of one or more of the presented indications of the mount incidents for consideration in determining the optimal breeding time.

14. The mobile platform of claim 8, wherein the mobile platform comprises a personal mobile device.

15. The method of claim 1, wherein the display screen is a touch screen.

16. The method of claim 2, wherein presenting to a user further includes an option to adjust a beginning of the window of time.

17. The method of claim 2, wherein presenting to a user further includes an option to adjust an ending of the window of time.

18. The mobile platform of claim 8, wherein the display screen is a touch screen.

19. The mobile platform of claim 9, wherein the communication system is further configured to communicate with the display screen to present to a user an option to adjust a beginning of the window of time.

20. The mobile platform of claim 9, wherein the communication system is further configured to communicate with the display screen to present to a user an option to adjust an ending of the window of time.

\* \* \* \* \*